United States Patent [19]

El-Banna

[11] Patent Number: 4,592,076
[45] Date of Patent: May 27, 1986

[54] SYNCHRONIZING SIGNAL RECOVERY CIRCUIT FOR RADIOTELEPHONES

[75] Inventor: Mahmoud A. S. El-Banna, Mississauga, Canada

[73] Assignee: Novatel Communications Ltd., Calgary, Canada

[21] Appl. No.: 518,481

[22] Filed: Jul. 29, 1983

[51] Int. Cl.⁴ .............................................. H04L 7/00
[52] U.S. Cl. .................................... 375/108; 375/120
[58] Field of Search ................. 375/81, 118, 119, 120, 375/108, 111

[56] References Cited

U.S. PATENT DOCUMENTS 3,613,015 10/1971 Lewis et al. ........................ 375/110
4,464,771 8/1984 Sorensen ............................. 375/120

Primary Examiner—Joseph A. Orsino, Jr.
Attorney, Agent, or Firm—Achmed N. Sadik

[57] ABSTRACT

An improved circuit for synchronizing signal recovery particularly suitable for mobile radiotelephone operation is disclosed. The initializing circuit of the phase-locked loop in the data receiver is inhibited for a predetermined duration upon triggering of a "window mode" by either of a rising or falling pulse-edge in a sequence of "ones" or "zeros" in the received data. The window mode masks the invalid transitions in such sequences and prevents retriggering by such transitions.

10 Claims, 2 Drawing Figures

SYNCHRONIZING SIGNAL RECOVERY CIRCUIT FOR RADIOTELEPHONES

FIELD OF THE INVENTION

The present invention relates to circuits for timing signal recovery, and in particular to an improved circuit for such signal recovery in the presence of noise and other corrupting transmission impairments. More particularly still it relates to mobile radiotelephone receivers.

BACKGROUND OF THE INVENTION

U.S. Pat. No. 4,029,900 granted June 14, 1977 to E. J. Addeo discusses at length the problems associated with reception in mobile radiotelephone systems. Circuits for recovery of digital synchronizing signals are disclosed therein that constitute significant improvements over the prior art, in particular, synchronizing characters in a data stream are detected and the resulting character indicating signals are utilized in conjunction with a stable bit clock signal to generate word synchronizing signals only after at least two bit rate clock pulses and synchronizing character indicators have been detected in coincidence. Furthermore, the circuits employ the well known digital phase-locked loop (DPLL) that is initialized upon the detection of a data message introductory character and that thereafter locks in response to an approximate bit rate timing signal derived from the data signal bit stream. This digital phase-locked loop produces a stable bit rate clock for use by the words synchronizing circuits. In the latter circuits, a timing chain counts down the stable bit clock to provide words synchronizing rate pulses which are used for output word synchronizing signals. The timing chain is forced to an initial count state by a first coincidence of a synchronizing character with a stable bit clock pulse and produces a word synchronizing rate pulse at one word synchronizing interval after such coincidence. If the latter pulse coincides with another synchronizing character indicating pulse and a bit clock pulse, the forcing of the timing chain to an initial count state is inhibited until such time as the loss of at least a predetermined number of plural successive synchronizing character indicators is detected.

The U.S. Pat. No. 4,029,900 is incorporated herein by reference in its entirety.

SUMMARY OF THE INVENTION

The present invention endeavors to improve the operation of the above mentioned recovery circuits by providing an improved receiver circuit capable of two modes of operation during synchronization signal aquisition. In addition to the flywheel mode of operation the present circuit provides a "window mode". During sequences of logic "zeros" or "ones" in the incoming data, invalid transitions are masked by the window mode circuit in order to eliminate the 180° phase ambiguity once a rising or falling data pulse-edge has been detected.

In addition, a flywheel mode control circuit is utilized which activates a flywheel masking window, similar to the window mode, once a signal is received from the external CPU of the system indicating word synchronization.

These improvements result in yet faster synchronization signal aquisition by the receiver and in improved system stability.

Thus, according to the present invention, there is provided an improved synchronizing signal recovery circuit in a receiver for data signals having a predetermined word rate, a predetermined bit rate, and a predetermined synchronizing character rate, comprising:

generating means for aquiring a stable clock from said data signals at said bit rate;

initializing means responsive to said data signals for intializing said generating means; and first inhibiting means for inhibiting said intializing means from reinitializing said generating means for a predetermined duration upon being triggered by one of rising and falling pulse-edges in said data signals.

BRIEF DESCRIPTION OF THE DRAWINGS

The preferred embodiment of the present invention will now be described in conjunction with the accompanying drawings in which.

DETAILED DESCRIPTION OF THE PREFERRED EMBODIMENT

Figure 1:
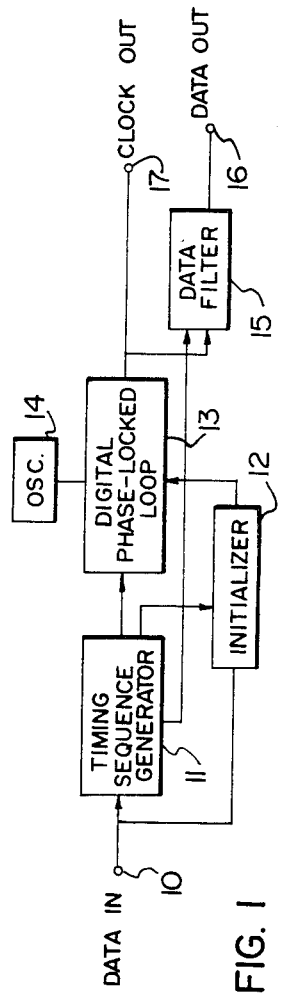
FIG. 1 is a general block schematic showing major component blocks of a data receiver in a mobile radiotelephone system.

With reference to FIG. 1 of the drawings a brief description of the general block schematic of a data receiver is given. Terminal 10 receives the DATA IN from a mobile radio circuit (not shown), which data is in a format known as the Manchester Code. A timing generator 11, as well as an initializer circuit 12, receives the Manchester Data. A digital phase-locked loop (DPLL) 13, which is supplied by a stable clock at 2.56 MHz from an oscillator 14, locks onto the exact frequency of the data clock generated in the timing generator 11 until reinitialized by the initializer circuit 12. The output of the DPLL 13 clocks data supplied to a data filter 15 by the timing generator 11 (which is a version of the input Manchester Data) to yield a non-return-to-zero (NRZ) version of the Manchester Data which is filtered and output as a DATA OUT terminal 16. In addition, the output of the DPLL 13 is also output of a CLOCK OUT terminal 17 to supply other circuits with a stable clock at the data rate.

In mobile radiotelephones Manchester Data is normally transmitted at the clock rate of 10 KHz, which is, therefore, the frequency at which the DPLL 13 operates. The DPLL 13 is initialized by the initializer circuit 12 in order to speed-up the phase-locked acquisition time as a data burst is received.

Data encoded in Manchester format represents an NRZ binary or logic "one" by a transition from zero-to-one in the centre of the bit cell. An NRZ "zero" is represented by a transition from one-to-zero in the centre of the bit cell.

Figure 2:
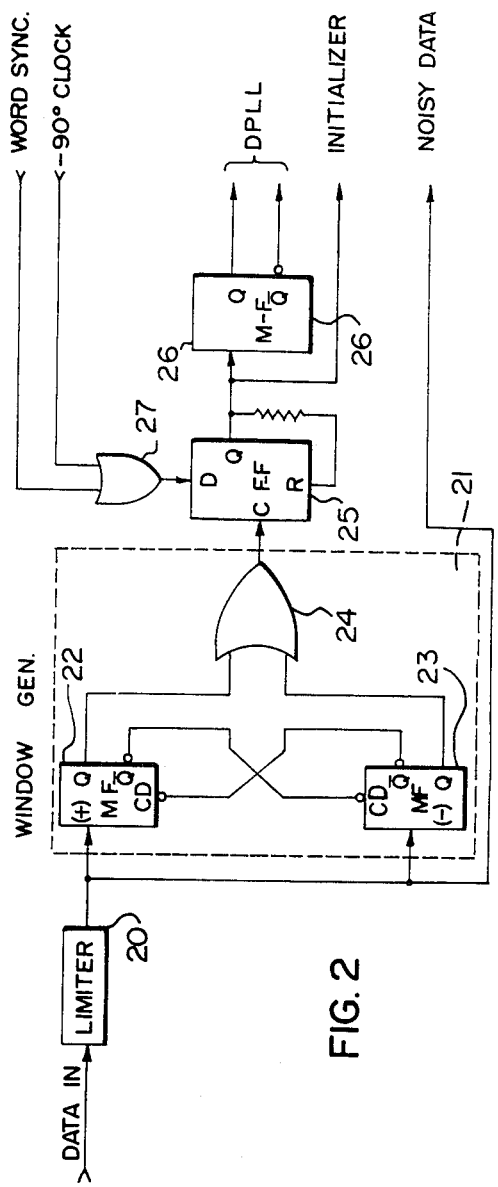
FIG. 2 is a schematic of a window mode timing sequence generator circuit according to the present invention for use in the data receiver of FIG. 1.

The "window mode" of operation is provided by the circuit shown in FIG. 2. After the DATA IN is limited by limiter 20 it is applied to a window generator 21 which comprises two monostable circuits 22 and 23, each having its Q̄ output connected to the clear terminal CD of the other and its Q output connected to an OR-gate 24, the output of which constitutes the output of the window generator 21. The limited data from the limiter 20 is applied to the mono-flop 22 input which responds to positive or rising pulse-edge transitions, and is also applied to the mono-flop 23 input which responds to negative or falling pulse-edge transitions. Accordingly, once a pulse sequence has started by either of the mono-flops 22 or 23 by having been triggered by a rising or falling pulse-edge, respectively, the operation of the other mono-flop is inhibited for the duration of the monostable pulse width, which in the present case is selected to be 75 microseconds, given that transitions occur every 100 microseconds at the used 10 KHz data rate. Thus a 75 microseconds window is created which eliminates the 180° ambiguity by masking out all invalid transitions present during a sequence of "zeros" or "ones" in the incoming Manchester data. Thus the initializer circuit 12 is periodically inhibited from reinitializing the DPLL 13 except once every 100 microseconds.

In the "fly-wheel mode" it is also desirable to prevent noise pulses from generating a false transition during all "ones" or all "zero's" in the data, which would cause the regenerated clock to slip out of phase. For this purpose a fly-wheel control is provided which causes a 50 microsecond masking window to be inserted which prevents the generation of a false trigger sequence of the DPLL 13. The 50 microseconds window is inserted on command from the system microprocessor (not shown) indicating the occurence of word synchronization. This is all carried out by the remainder of the circuit in FIG. 2. The output of the OR-gate 24 is applied to a flip-flop 25 which generates a narrow (250 nanosecond) initilization pulse everytime a valid Manchester data transition occurs during "zero" and "one" sequences. The initialize pulse is applied to the initializer circuit 12 as a gating pulse to reset the DPLL 13, but also to a 50 microsecond monostable circuit 26. The flip-flop 25 has its D-input controlled by an OR-gate 27 which relays the mocroprocessor command WORD SYNC and the −90° clock of the system. The monostable 26 has its Q and $\overline{Q}$ outputs applied to the DPLL 13 phase-detector inputs to clear it only if there is no WORD SYNC signal present from the microprocessor. When there is a WORD SYNC signal, the monostable 26 applies a pair of opposite polarity pulses, each 50 microseconds long, to inhibit the initialization of the DPLL 13.

What is claimed is:

1. An improved synchronizing signal recovery circuit in a receiver for data signals having a predetermined word rate, a predetermined bit rate, and a predetermined synchronizing character rate, comprising:
   generating means for acquiring a stable clock from said data signals at said bit rate;
   initializing means responsive to said data signals for initializing said generating means;
   first inhibiting means for inhibiting said initializing means from reinitializing said generating means for a predetermined duration upon being triggered by one of rising and falling pulse-edges in said data signals;
   indicating means for indicating recognition of a synchronizing character; and
   second inhibiting means responsive to said first inhibiting means and to said indicating means for inhibiting said generating means from recommencing acquisition of said stable clock.

2. The improved synchronizing signal recovery circuit as defined in claim 1 said generating means being a digital phase-locked loop.

3. The improved synchronizing signal recovery circuit as defined in claim 1, said generating means being a digital phase-locked loop.

4. The improved synchronizing signal recovery circuit as defined in claim 1, said second inhibiting means being a monostable circuit for generating a pair of opposite polarity pulses for a preselected duration upon being triggered.

5. The improved synchronizing signal recovery circuit as defined in claim 1, said generating means being a digital phase-locked loop having a phase detector input responsive to said second inhibiting means.

6. The improved synchronizing signal recovery circuit as defined in claim 5, said first inhibiting means comprising first and second monostable circuits, each inhibiting the other once triggered, one responsive to rising and the other to falling pulse-edges, and both having their outputs OR-ed to generate an inhibiting signal for said predetermined duration upon either of them being triggered by one of said pulse-edges.

7. The improved synchronizing signal recovery circuit as defined in claim 5, said second inhibiting means being a monostable circuit for generating a pair of opposite polarity pulses for a preselected duration upon being triggered.

8. The improved synchronizing signal recovery circuit as defined in claim 1, said first inhibiting means comprising first and second monostable circuits, each inhibiting the other once triggered, one responsive to rising and the other to falling pulse-edges, and both having their outputs OR-ed to generate an inhibiting signal for said predetermined duration upon either of them being triggered by one of said pulse-edges.

9. The improved synchronizing signal recovery circuit as defined in claim 8, said second inhibiting means being a monostable circuit for generating a pair of opposite polarity pulses for a preselected duration upon being triggered.

10. An improved synchronizing signal recovery circuit in a receiver for data signals having a predetermined word rate, a predetermined bit rate, and a predetermined synchronizing character rate, comprising:
    generating means for acquiring a stable clock from said data signals at said bit rate;
    initializing means responsive to said data signals for initializing said generating means; and
    first inhibiting means for inhibiting said initializing means from reinitializing said generating means for a predetermined duration upon being triggered by one of rising and falling pulse-edges in said data signals;
    said first inhibiting means comprising first and second monostable circuits, each inhibiting the other once triggered, one responsive to rising and the other to falling pulse-edges, and both having their outputs OR-ed to generate an inhibiting signal for said predetermined duration upon either of them being triggered by one of said pulse-edges.

* * * * *